(12) United States Patent
Hosoi et al.

(10) Patent No.: US 8,219,313 B2
(45) Date of Patent: Jul. 10, 2012

(54) NAVIGATION DEVICE AND PROGRAM

(75) Inventors: Yasuki Hosoi, Toyota (JP); Syougo Matsuhisa, Kariya (JP)

(73) Assignee: Aisin AW Co., Ltd., Anjo (JP)

( * ) Notice: Subject to any disclaimer, the term of this patent is extended or adjusted under 35 U.S.C. 154(b) by 371 days.

(21) Appl. No.: 12/461,915

(22) Filed: Aug. 27, 2009

(65) Prior Publication Data

US 2010/0100309 A1   Apr. 22, 2010

(30) Foreign Application Priority Data

Oct. 16, 2008   (JP) ................................. 2008-267041

(51) Int. Cl.
*G01C 21/00* (2006.01)
(52) U.S. Cl. ..................... 701/410; 701/461; 701/414
(58) Field of Classification Search .................. 701/410, 701/433, 533, 540
See application file for complete search history.

(56) References Cited

U.S. PATENT DOCUMENTS

| | | | |
|---|---|---|---|
| 5,168,452 A | | 12/1992 | Yamada et al. |
| 5,502,640 A | * | 3/1996 | Yagyu et al. .................. 701/200 |
| 5,513,110 A | * | 4/1996 | Fujita et al. .................. 701/207 |
| 5,684,704 A | * | 11/1997 | Okazaki ........................ 701/208 |
| 5,899,955 A | * | 5/1999 | Yagyu et al. .................. 701/209 |
| 5,978,732 A | * | 11/1999 | Kakitani et al. ............... 701/209 |
| 6,636,802 B1 | * | 10/2003 | Nakano et al. ................ 701/208 |
| 6,882,931 B2 | * | 4/2005 | Inoue ............................ 701/201 |
| 6,898,520 B2 | * | 5/2005 | Kao et al. ...................... 701/209 |
| 6,980,906 B2 | * | 12/2005 | Kao et al. ...................... 701/209 |
| 7,698,060 B2 | * | 4/2010 | Nomura ........................ 701/208 |
| 2004/0111215 A1 | * | 6/2004 | Inoue ............................ 701/209 |
| 2005/0140524 A1 | * | 6/2005 | Kato et al. ............... 340/995.13 |
| 2005/0270306 A1 | * | 12/2005 | Nomura ........................ 345/619 |
| 2006/0173614 A1 | * | 8/2006 | Nomura ........................ 701/210 |
| 2008/0082255 A1 | * | 4/2008 | Takahata et al. .............. 701/201 |
| 2008/0103693 A1 | * | 5/2008 | Kato et al. .................... 701/209 |

FOREIGN PATENT DOCUMENTS

| | | |
|---|---|---|
| JP | A-2-56591 | 2/1990 |
| JP | A-11-257987 | 9/1999 |

\* cited by examiner

*Primary Examiner* — Helal A Algahaim
(74) *Attorney, Agent, or Firm* — Oliff & Berridge, PLC

(57) ABSTRACT

Navigation devices, methods, and programs store map data hierarchically with the map data of a hierarchy level being excluded. The devices, methods, and programs read the stored map data, perform a route search within each predetermined area on a departure point side and a destination side, and acquire a shortest cost route in a range overlapped in search areas. In a hierarchy level having a proximal higher hierarchy level of which the map data does not exist, the devices, methods, and programs expand the predetermined area into a search area in the proximal higher hierarchy level and acquire a first shortest cost route, and perform the route search in a higher hierarchy level to acquire a second shortest cost route. When the second shortest cost route's cost is smaller than the first shortest cost route's cost, the devices, methods, and programs update the cost of the shortest cost route.

8 Claims, 15 Drawing Sheets

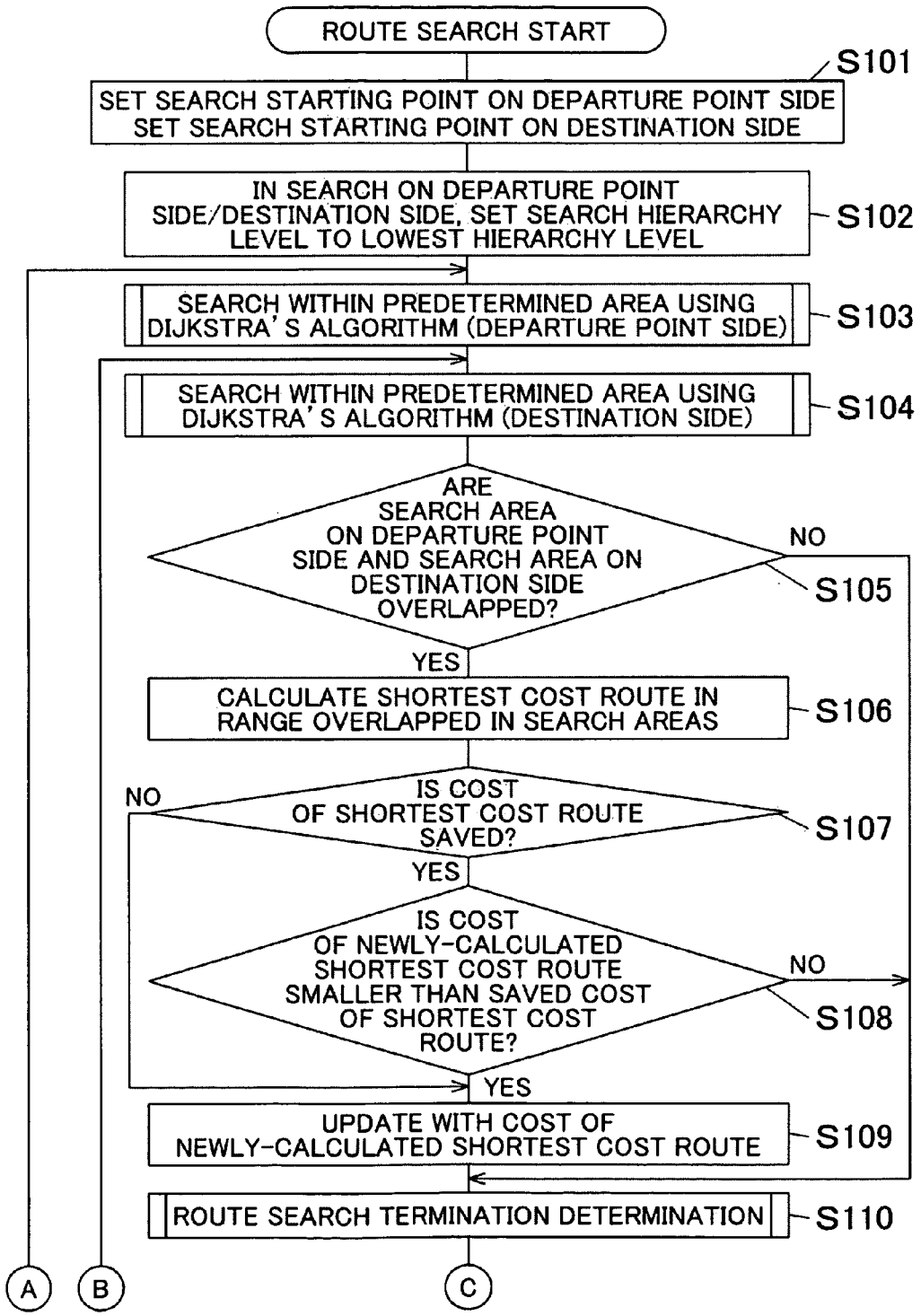

F I G . 8
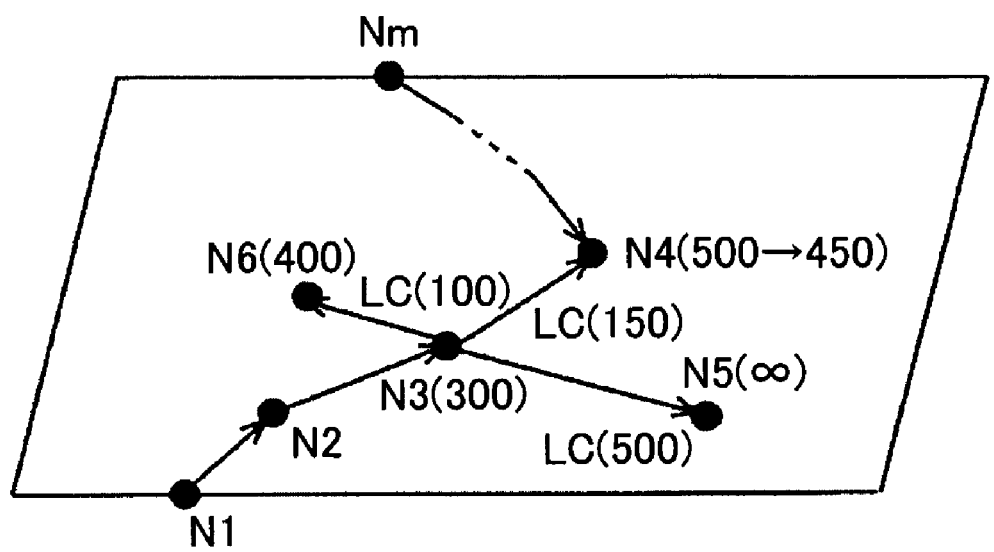

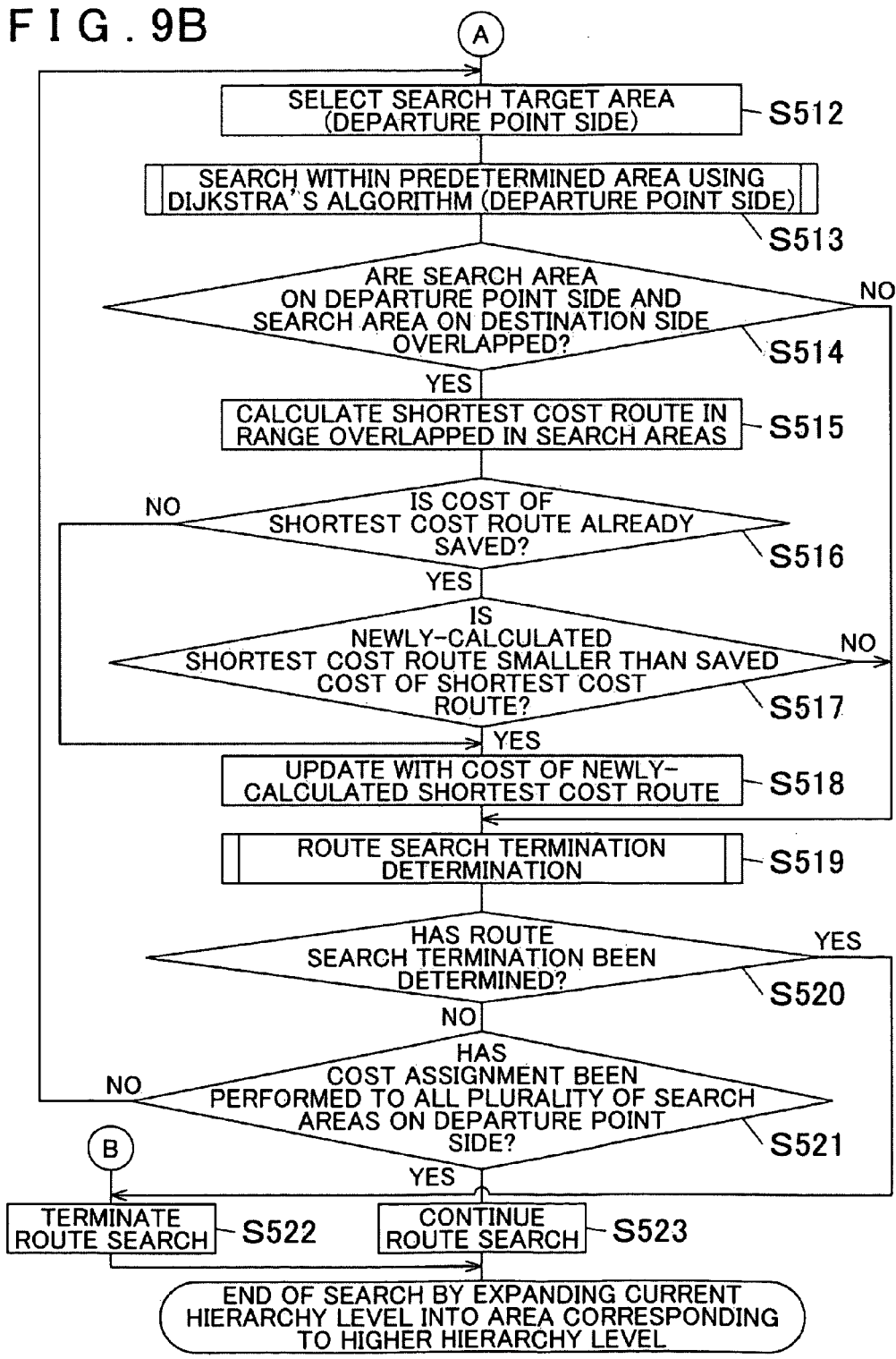

F I G . 13A
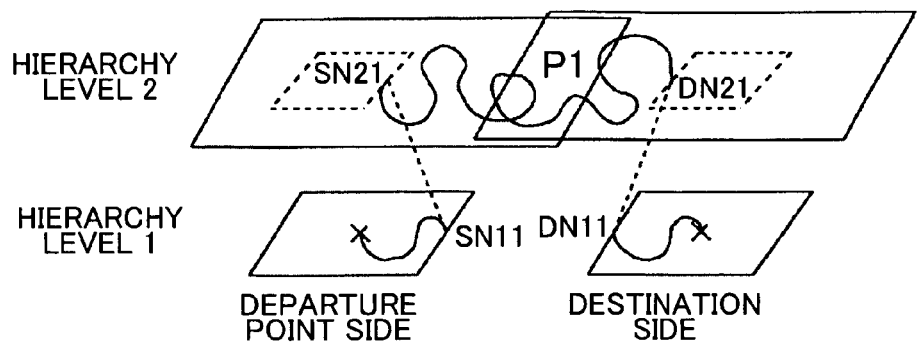
F I G . 13B
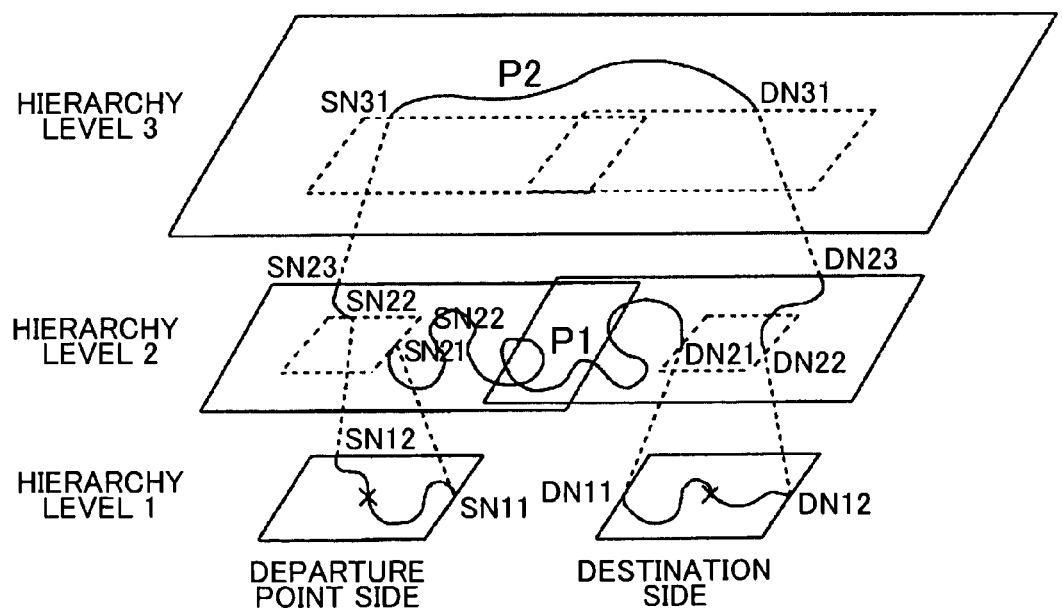

F I G . 14
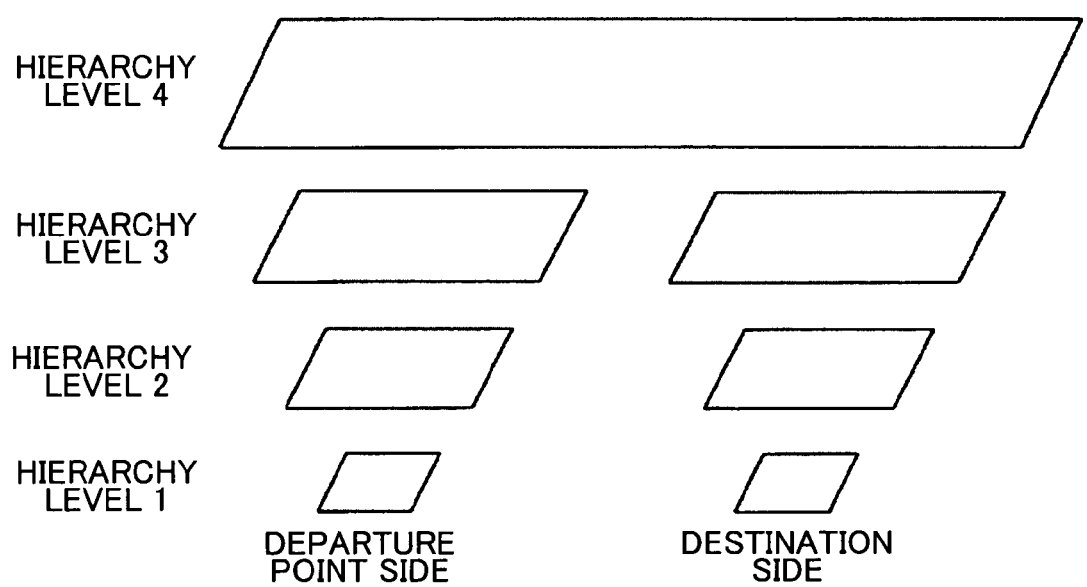

NAVIGATION DEVICE AND PROGRAM

INCORPORATION BY REFERENCE

The disclosure of Japanese Patent Application No. 2008-267041 filed on Oct. 16, 2008, including the specification, drawings and abstract thereof, is incorporated herein by reference in its entirety.

BACKGROUND OF THE INVENTION

1. Field of the Invention

The present invention relates to navigation devices and programs, in which the volume of map data in a hierarchical structure is reduced and route search time is shortened as well as route quality is maintained.

2. Description of the Related Art

In navigation devices, for route search, various costs are set to each link and each between links (each node) according to road types such as a motorway, a toll road, a national road, a principle regional road, a prefectural road, and a narrow road, no right-turn and no left-turn, whether or not a traffic regulation such as a one-way traffic exists, a link length, a road width, the number of lanes, and the like. In search for an appropriate route from a current position to a destination, a route is searched from a departure point and from the destination along the links stored in map data. In an overlapped part between the search from the departure point and the search from the destination, the accumulated cost from the departure point and the accumulated cost from the destination are added, and a route with the smallest cost-added value is set as a most appropriate guidance route.

A hierarchized search technique using the map data in the hierarchical structure is known as a method for shortening a time required for such route search (refer to Japanese Patent Application; Publication No. JP-A-2-56591). The map data in the hierarchical structure includes detailed map data having all road data in a lower hierarchy level and broad area map data having only principle road data in a higher hierarchy level. The hierarchized search technique is a method of calculating the costs using the detailed map data for the vicinity of the departure point and the destination and roughly calculating the costs using less-detailed map data for a middle area of the route, and aggregating both results and outputting the aggregated result as the guidance route. According to such hierarchized search technique, if the distance between the departure point and the destination is long, an intermediate route can be searched using the less-detailed map data. Therefore, comparing to when performing the search for a whole route using the detailed map data, total time required for the route search can be shortened.

In addition, there is a technique of acquiring the most appropriate route in a shorter time, by terminating the route search when a shortest cost route has been determined in the map data in the lower hierarchy level where the route search was performed, without performing the route search in the map data in the higher hierarchy level which will be target for the route search (refer to Japanese Patent Application; Publication No. JP-A-11-257987). For example, in FIG. 13A, when the search is performed within each predetermined area on the departure point side and the destination side in a hierarchy level 1 having the detailed map data, and a boundary node SN11 that has a smallest search cost in the area on the departure point side and a boundary node DN11 that has a smallest search cost in the area on the destination side are searched, these boundary nodes are migrated to the corresponding nodes SN21 and DN21 in a hierarchy level 2, and then the route search is performed in the hierarchy level 2. When the route from the departure point side and the route from the destination side are connected in the overlapped part in the hierarchy level 2, a route P1 is set as the most appropriate route.

SUMMARY OF THE INVENTION

In the before-mentioned route search techniques, if the map data in the hierarchical structure and a route search algorism are combined, the algorism to shorten the time required for the route search does not assure that the route P1 acquired by the route search is the most appropriate route also in quality. For example, in FIG. 13B, a boundary node on the departure point side SN12 and a boundary node on the destination side DN12 of which the boundary arrival costs are not the smallest in each predetermined area in the hierarchy level 1 exist. Then, in the search using nodes SN22 and DN22 in the hierarchy level 2 that correspond to the boundary nodes SN12 and DN12 as starting points, the nodes SN23 and DN23 of which the boundary arrival costs are the smallest in each predetermined area on the departure point side and the destination side in the hierarchy level 2 are searched. In the search using nodes SN31 and DN31 in the hierarchy level 3 that correspond to the nodes SN23 and DN23 as starting points, a route P2 is searched. In this case, there is a possibility that the search cost of the route P2 is smaller than the search cost of the route P1. If the search cost of the route P2 is smaller, the route P2 is a route more appropriate in quality than the route P1. That is, only by finding a route connecting the departure point and the destination as quick as possible using the map data in the hierarchical structure, it is not always possible to search for a route with the smallest search cost, in other words, to search in the shortest time for a route that is the most appropriate in quality, because there is a possibility, for example, that a route including twisty mountain roads or the like is searched.

However, in order to make it possible to search for a route with high quality using the hierarchical search technique, it is necessary to increase the number of hierarchy levels of the map data. For example, it becomes possible to search for a route with remarkably high quality by increasing the number of hierarchy levels of the map data such as a hierarchy level 1 with detailed map data including all road data, a hierarchy level 2 including the road data over a general road, a hierarchy level 3 including the road data over a prefectural road, and a hierarchy level 4 including only motorway road data, as shown in FIG. 14, and performing the route search from the departure point side and the destination side. However, the volume of the map data is increased, which causes a problem that all the map data cannot be stored in small storage media like a SD card.

In order to solve the problems described above, it is an object of the present invention to reduce the volume of the map data in the hierarchical search technique and shorten the time required for the route search while maintaining the quality of the route acquired by the route search.

The present invention provides a navigation device that searches for a route from a departure point to a destination, including: an information storage unit that stores map data in a hierarchical structure, in which the map data of at least one hierarchy level has been excluded; a route search unit that reads the map data in the hierarchical structure from the information storage unit, performs route search within each predetermined area on a departure point side and a destination side, and acquires a shortest cost route in a range overlapped in search areas; and a control unit that controls the route search of the route search unit, wherein the route search unit, in the route search in a hierarchy level having a proximal higher hierarchy level of which the map data does not exist, expands the predetermined area into a search area in the proximal higher hierarchy level and performs the route search to acquire a first shortest cost route, and further performs the route search in a higher hierarchy level to acquire a second shortest cost route, and the control unit, when a cost of the second shortest cost route is smaller than the cost of the first shortest cost route, updates the cost of the shortest cost route.

The present invention provides a navigation device including: an information storage unit that stores information relating to a road; a route search unit that searches for a route to a destination based on road information stored in the information storage unit; and a control unit that determine quality of the route searched by the route search unit and controls route search processing, wherein the road information is structured with data levels in a plurality of hierarchy levels with different degree of details, in which at least one hierarchy level has been excluded, the route search unit performs route search with detailed data in a range of each predetermined area on a departure point side and a destination side, expands, in the route search in a hierarchy level having a proximal higher hierarchy level of which the map data does not exist, the predetermined area into a search area in the proximal higher hierarchy level and performs the route search, and then moves to a data level in a higher hierarchy level and continues the route search, and the control unit, when a route was connected between a departure point and a destination, compares a cost of the route searched in the data level in the higher hierarchy level with a cost of the route searched in the data level in a lower hierarchy level and terminates route search processing if it is determined that the cost of the route searched in the data level in the lower hierarchy level is lower than the cost of the route searched in the data level in the higher hierarchy level.

The present invention provides a program that controls a navigation device performing route search from a departure point to a destination, the program that causes a computer to perform the steps of: reading map data in a hierarchical structure, in which the map data of at least one hierarchy level has been excluded, from an information storage unit; performing the route search within each predetermined area on a departure point side and a destination side, expanding, in the route search in a hierarchy level having a proximal higher hierarchy level of which the map data does not exist, the predetermined area into a search area in the proximal higher hierarchy level and performing the route search to acquire a first shortest cost route in a range overlapped in search areas, and further performing the route search in a higher hierarchy level to acquire a second shortest cost route in a range overlapped in search areas; when a cost of the second shortest cost route is smaller than the cost of the first shortest cost route, updating the cost of the shortest cost route.

The present invention realizes to reduce the volume of the map data by excluding a certain hierarchy level from the hierarchized map data and shorten the time required for the route search while maintaining the quality of the route acquired by the route search.

BRIEF DESCRIPTION OF THE DRAWINGS

FIGS. 5A and 5B illustrate an entire flow of route search processing according to the embodiment of the present invention.

FIG. 8 illustrates a cost assignment to nodes in a search hierarchy level.

FIGS. 9A and 9B illustrate a flow of performing search processing by expanding a current hierarchy level into an area corresponding to a higher hierarchy level.

FIGS. 13A and 13B explain the route search using the map data in the hierarchical structure.

FIG. 14 illustrates the map data in which the number of hierarchy levels was increased.

DETAILED DESCRIPTION OF THE PREFERRED EMBODIMENT

The present invention is described in further detail below with reference to an embodiment.

Figure 1:
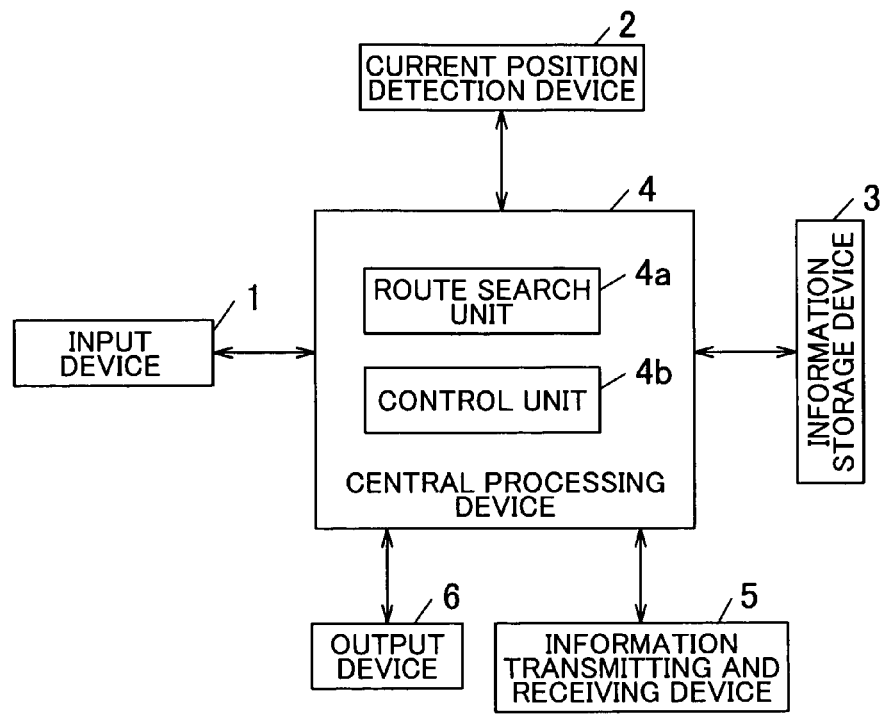
FIG. 1 is a block diagram showing an example of a navigation device according to an embodiment of the present invention.

FIG. 1 is a block diagram showing an example of a navigation device according to the embodiment of the present invention. The navigation device includes an input device 1, a current position detection device 2, an information storage device 3, a central processing device 4, an information transmitting and receiving device 5, and an output device 6. The input device 1 includes a keyboard, a mouth, a touch panel, an operation key, and the like for inputting information of a departure point and a destination. The current position detection device 2 detects information relating to a current position. The information storage device 3 stores map data in a hierarchical structure, in which the map data of at least one hierarchy level has been excluded to reduce data volume, intersection data, navigation data necessary for route search, guidance data of display/sound necessary for route guidance, a program (an application and/or an OS) for performing map display, route search, and guidance such as audio guidance, and the like. The central processing device 4 includes a route search unit 4a that reads out the map data in the hierarchical structure, performs the route search within each predetermined area on the departure point side and the destination side, and acquires a shortest cost route in a range overlapped in search areas, and a search control unit 4b that determines quality of routes searched by the route search unit through a comparison of costs and controls search processing by the route search unit. The central processing device 4 performs, as a navigator processing unit, map display processing, display/audio guidance processing necessary for the route guidance, and also control of whole system. The information transmitting and receiving device 5 transmits and receives information relating to vehicle's drive such as road information and traffic information, detects information relating to a current position of a vehicle, and transmits and receives information relating to the current position. The output device 6 is a display, a speaker, or the like that outputs information relating to the route guidance.

Figure 2:
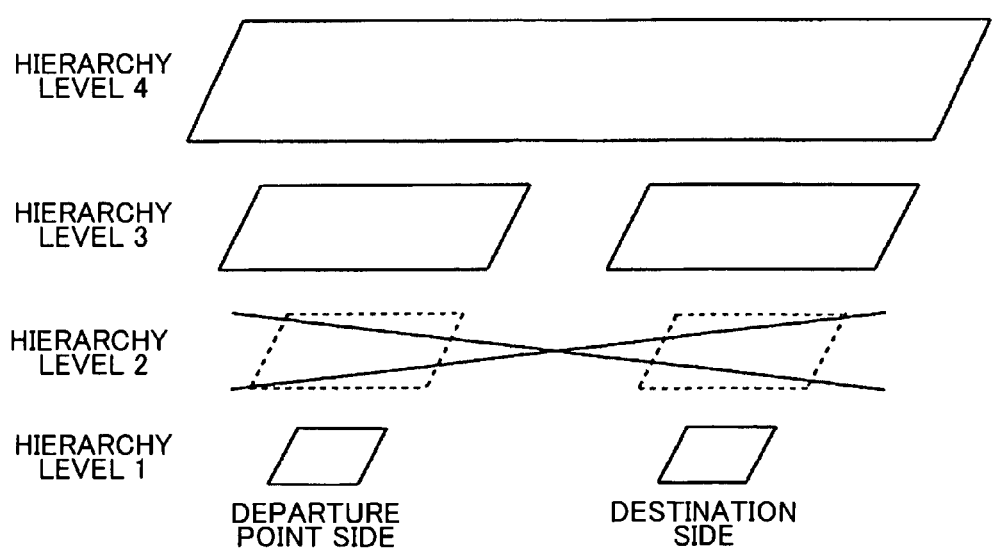
FIG. 2 illustrates an example of map data in a hierarchical structure according to the embodiment of the present invention.

FIG. 2 illustrates an example of the map data in the hierarchical structure according to the embodiment of the present invention.

The map data in the hierarchical structure in the present embodiment has a data structure in which the map data of at least one hierarchy level has been excluded to reduce the data volume. The illustrated example has four-hierarchy level structure and the data of the hierarchy level 2 is excluded. The hierarchy level 1 includes detailed map data having all road data. The hierarchy level 2 including road data over a general road is excluded. The hierarchy level 3 includes the road data over a prefectural road, and the hierarchy level 4 includes only motorway road data. In the hierarchy level 2, search area by block is defined, however, the road data does not exist and its condition is defined over data format. The central processing device 4 utilizes the data of the hierarchy level 2 for acquisition of the search area, but does not perform acquisition processing of contents of the data because it is known that there is no road data. In order to reduce the map data volume, it is effective to exclude the map data in a lower hierarchy level having the detailed road data of which the data volume is large. On the other hand, it is necessary to include all road data. Based on this perspective, the map data of the hierarchy level 2 that is one hierarchy level higher than the lowest hierarchy level is excluded in the present embodiment. As the hierarchy level 1 includes all road data, it is also possible to exclude all the other hierarchy levels and perform the route search only with the data of hierarchy level 1. However, such method adversely affects a search time and the quality of a searched route. Consequently, in order to reduce the data volume, it is preferable to exclude the map data of a hierarchy level that is higher than the lowest hierarchy level but as low as possible, although it depends on the hierarchical structure.

Figure 3:
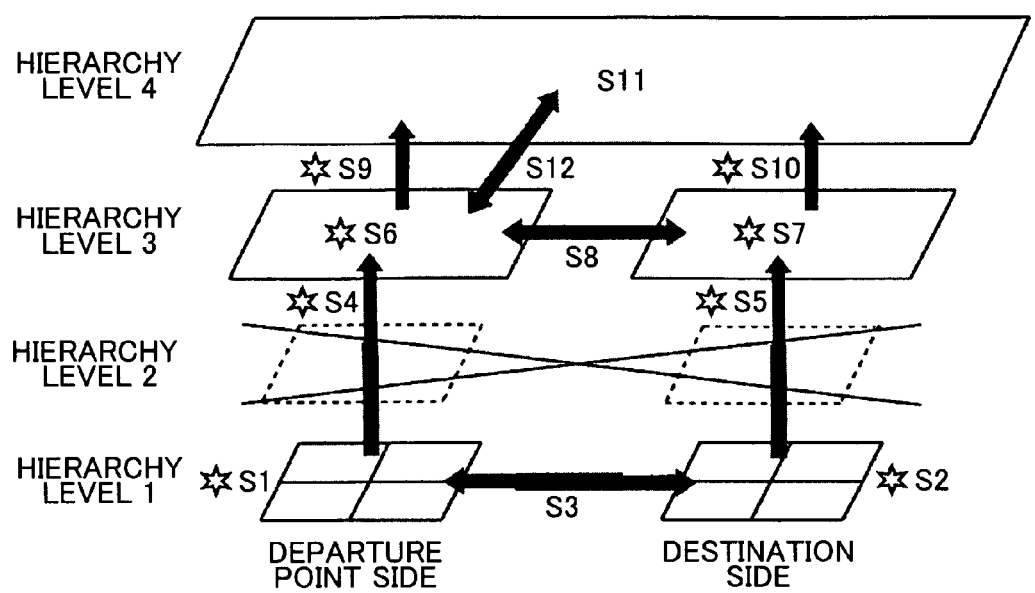
FIG. 3 roughly illustrates route search and cost assignment processing.

FIG. 3 illustrates the route search and cost assignment processing according to the embodiment of the present invention. Here, processing order in the case of using the map data in four-hierarchy level structure in which the map data of the hierarchy level 2 has been excluded is indicated. The map data in the hierarchical structure is structured with a plurality of blocks as predetermined areas (the larger the data volume is, the smaller the area is) in each hierarchy level. The lower hierarchy level is structured with the detailed map data including all road map data. The higher the hierarchy level is, the broader area map data with only major road data is included. At first, the route search is performed within each predetermined area on departure point side and the destination side using the detailed map data in the hierarchy level 1. Here, the search in the hierarchy level 1 covers the range in the hierarchy level 2 of which data is excluded. Normally, the area to search in the hierarchy level 1 is small. However, the area is expanded into the range to search in the hierarchy level 2 and searched (Step S1 and S2), and the costs of boundary nodes in each area are calculated and saved. If the routes searched in both areas are overlapped, it is set as the shortest cost route and the cost is calculated (Step S3) (star signs in FIG. 3 indicate that the costs are saved). There is no map data in the hierarchy level 2 but the areas are defined; therefore, search results in the hierarchy level 1 is applied to the areas of the hierarchy level 2. Subsequently, the nodes of the hierarchy level 3 that correspond to the boundary nodes in each area arrived in the search in the hierarchy level 1 are acquired (Step S4 and S5). Then, the route search in the predetermined area is performed using each of the acquired nodes as starting points and the arrival cost of each node is saved (Step S6 and S7). When the routes searched in the areas on the departure point side and on the destination side in the hierarchy level 3 are overlapped and the cost of the connected route is smaller than the cost of the shortest cost route acquired in the hierarchy level 1, the cost of the shortest route is updated (Step S8). In this manner, the search is performed in the areas on the departure point side and on the destination side in each hierarchy level, and if the routes searched in both areas are overlapped and the cost of the connected route is smaller than the cost of the shortest cost route acquired in a lower hierarchy level, the cost of the shortest cost route is updated and the procedure moves to the highest hierarchy level 4 (Step S9 and S10). The route should be connected in the highest hierarchy level 4. Therefore, the search is performed from the destination side (Step S11), if the cost of the route acquired in the highest hierarchy level 4 is smaller than the cost of the shortest cost route in a lower hierarchy level, the cost of the shortest cost route is updated (Step S12). The quality (cost) of the acquired route is maintained by continuing the search in each hierarchy level till the route with the shortest cost is acquired in this manner. In addition, if the arrival cost of the node in each hierarchy level is greater than the cost of the shortest cost route, cost assignment is not performed to subsequent nodes. When moving to the higher hierarchy level, if the total cost of smallest arrival costs among the boundary nodes on the departure point side and the destination side is greater than the cost of the shortest cost route, the route search is terminated (as will hereinafter be described in detail). In this manner, it is prevented that the search time is increased. As a result, it is possible to maintain the quality of the searched route and shorten the search time while reducing the map data volume.

Figure 4:
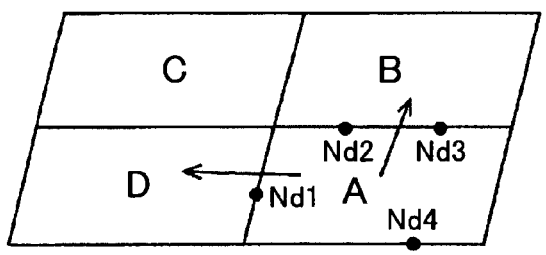
FIG. 4 is an explanatory figure in the case of expanding a search area of a hierarchy level 1 into a search area of a hierarchy level 2.

FIG. 4 is an explanatory figure in the case of expanding the search area in the hierarchy level 1 into the search area in the hierarchy level 2. As mentioned above, the map data of the hierarchy level 2 is excluded, but the search area is defined. Therefore, with this information, in the search in the hierarchy level 1, the area is enlarged into the range to be searched in the hierarchy level 2. In the illustrated example, it is assumed that an area A is the search area defined in the hierarchy level 1 (a search core area). Firstly, the search of the search core area is performed, and the costs of the boundary nodes Nd1, Nd2, Nd3, and Nd4 (the costs to the boundary) are acquired. Then, the search area is expanded by priority into a direction where the cost to the boundary is the smallest. For example, if the cost of Nd1 is the smallest, the search area is expanded by priority into an adjacent area having the Nd1 as a starting point. The search area is expanded into an area D in this example. Next, treating the area of A and D as one area, the search area is expanded by priority into the direction where the cost to the boundary in this area is the smallest. For example, in the illustrated example, if the cost of Nd3 is the smallest, the search area is expanded by priority into an area B. The search area is sequentially expanded in the same way. In this manner, the search area is expanded into the range to be searched in the hierarchy level 2 and the boundary nodes and the costs in the area are acquired.

Figure 5B:
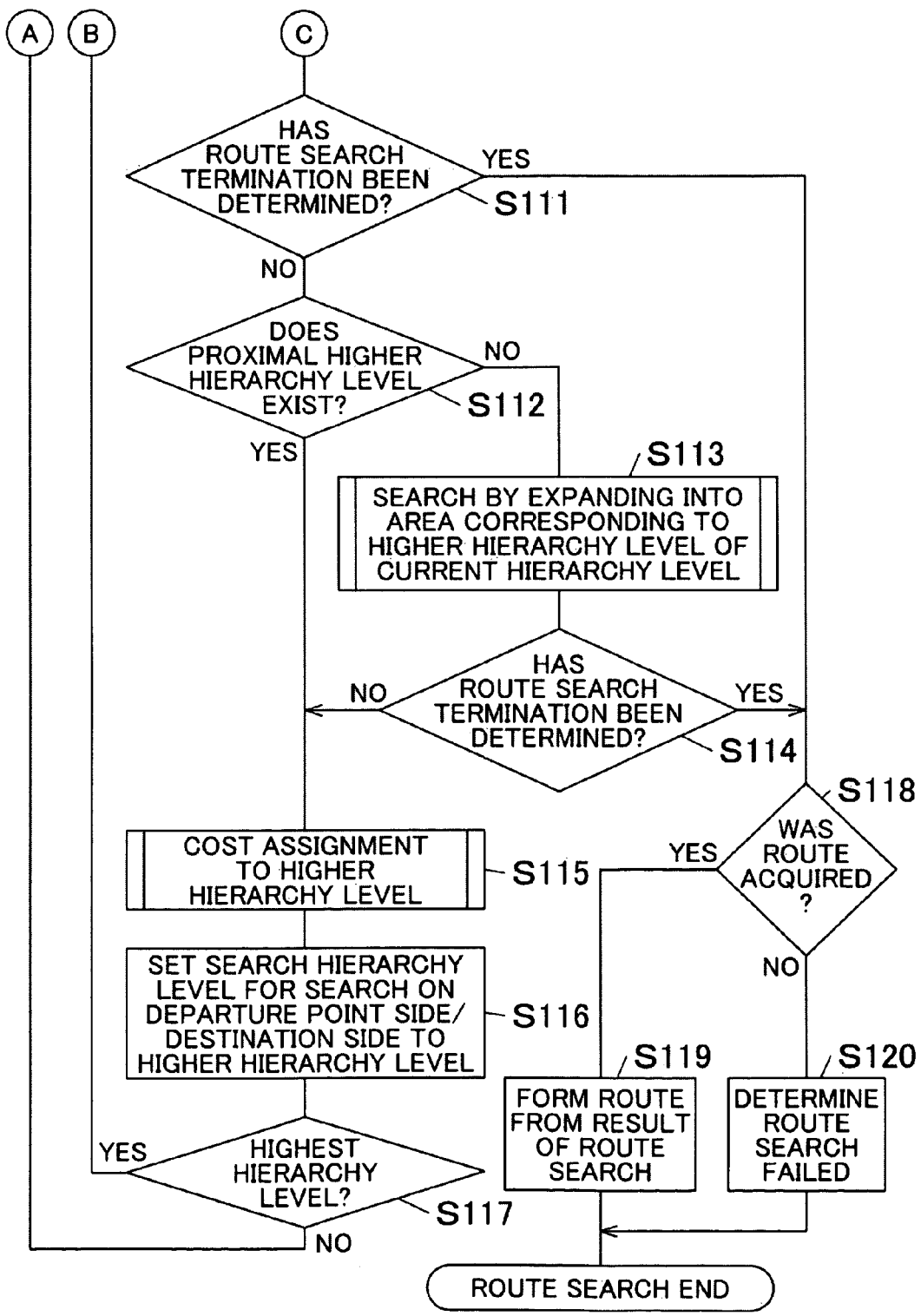

FIGS. 5A and 5B illustrate an entire flow of route search processing in the case of using the map data in the hierarchical structure, in which the map data of the hierarchy level 2 has been excluded, such as the map data shown in FIG. 2.

Figure 6A:
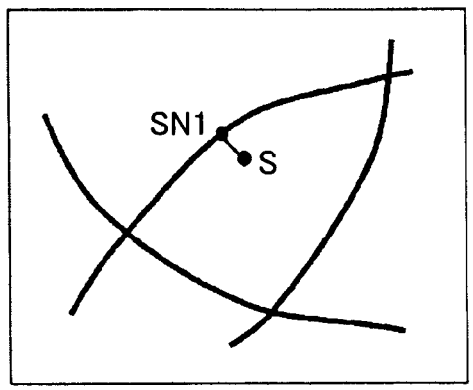
FIGS. 6A and 6B illustrate search starting points on a departure point side and on a destination side.
Figure 6B:
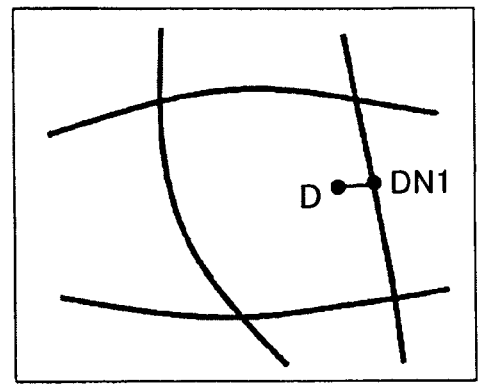

Firstly, a search starting point on the departure point side and a search starting point on the destination side are set (Step S10). As indicated in FIGS. 6A and 6B, these points are set to a node SN1 on a search target road closest to a departure point S (see FIG. 6A) and a node DN1 on a search target road closest to a destination D (see FIG. 6B) for example. Next, in the search on the departure point side and on the destination side, a search hierarchy level is set to the lowest hierarchy level (Step S102). The search is performed within each predetermined area on the departure point side and the destination side using the Dijkstra's algorithm (Step S103 and S104). As illustrated in FIG. 4, the search is performed within each predetermined area (the search core area) on the departure point side and the destination side in the hierarchy level 1 using the Dijkstra's algorithm. On the roads, various costs are set to each link and each between links (each node) according to road types such as a motorway, a toll road, a national road, a principle regional road, a prefectural road, and a narrow road, no right-turn and no left-turn, whether or not a traffic regulation such as a one-way traffic exists, a link length, a road width, the number of lanes, and the like. Using the Dijkstra's algorithm, a route from the departure point to the destination is searched and such costs are added to acquire a route with the shortest cost (as will hereinafter be described in detail). It is determined whether or not the search area on the departure point side and the search area on the destination side in the search at Step S103 and S104 are overlapped (Step S105). If overlapped, the shortest cost route is calculated in the range overlapped in the search areas (Step S106).

Next, it is determined whether or not the shortest cost route is already acquired and the cost is saved (Step S107). If the cost is saved, it is determined whether or not the cost of the newly-calculated shortest cost route is smaller than the saved cost of the shortest cost route (Step S108). If the shortest cost route is not saved at Step S107, or if the cost of the newly-calculated shortest cost route is smaller at Step S108, the cost of the shortest cost route is updated (Step S109). If the search area on the departure point side and the search area on the destination side are not overlapped at Step S105, or if the cost of the newly-calculated shortest cost route is greater than the saved cost of the shortest cost route, a route search termination determination (as will hereinafter be described in detail) is performed (Step S110). With this determination, it is determined whether or not the route search termination has been determined (Step S111). If the termination has not been determined, it is determined whether or not a proximal higher hierarchy level exists (Step S112). For the hierarchy level 1, the proximal higher hierarchy level (the hierarchy level 2) does not exist; therefore, the area is expanded into the area corresponding to the higher hierarchy level (the hierarchy level 2) of the current hierarchy level (the hierarchy level 1) and the search is performed (Step S113) (as will hereinafter be described in detail). Next, it is determined whether or not the route search termination has been determined in the search at Step S113 (Step S114). If the route search termination is not determined, the cost assignment to the higher hierarchy level (as will hereinafter be described in detail) is performed (Step S115), and the search hierarchy level for the search on the departure point side and the destination side is set to the higher hierarchy level (Step S116). Next, it is determined whether or not this higher hierarchy level is the highest hierarchy level (Step S117). If this higher hierarchy level is not the highest hierarchy level, the procedure returns to Step S103 and the search processing from the departure point side is repeated in the same way. If this higher hierarchy level is the highest hierarchy level, the procedure returns to Step S104 and the search processing from the destination side is repeated in the same way. If the route search termination has been determined at Step S111 or Step S114, it is determined whether or not the route was acquired (Step S118). If the route is not acquired, the route search is determined failed (Step S120). If the route was acquired, the route is formed from the result of the route search (Step S119) and the route search processing is terminated.

Figure 7:
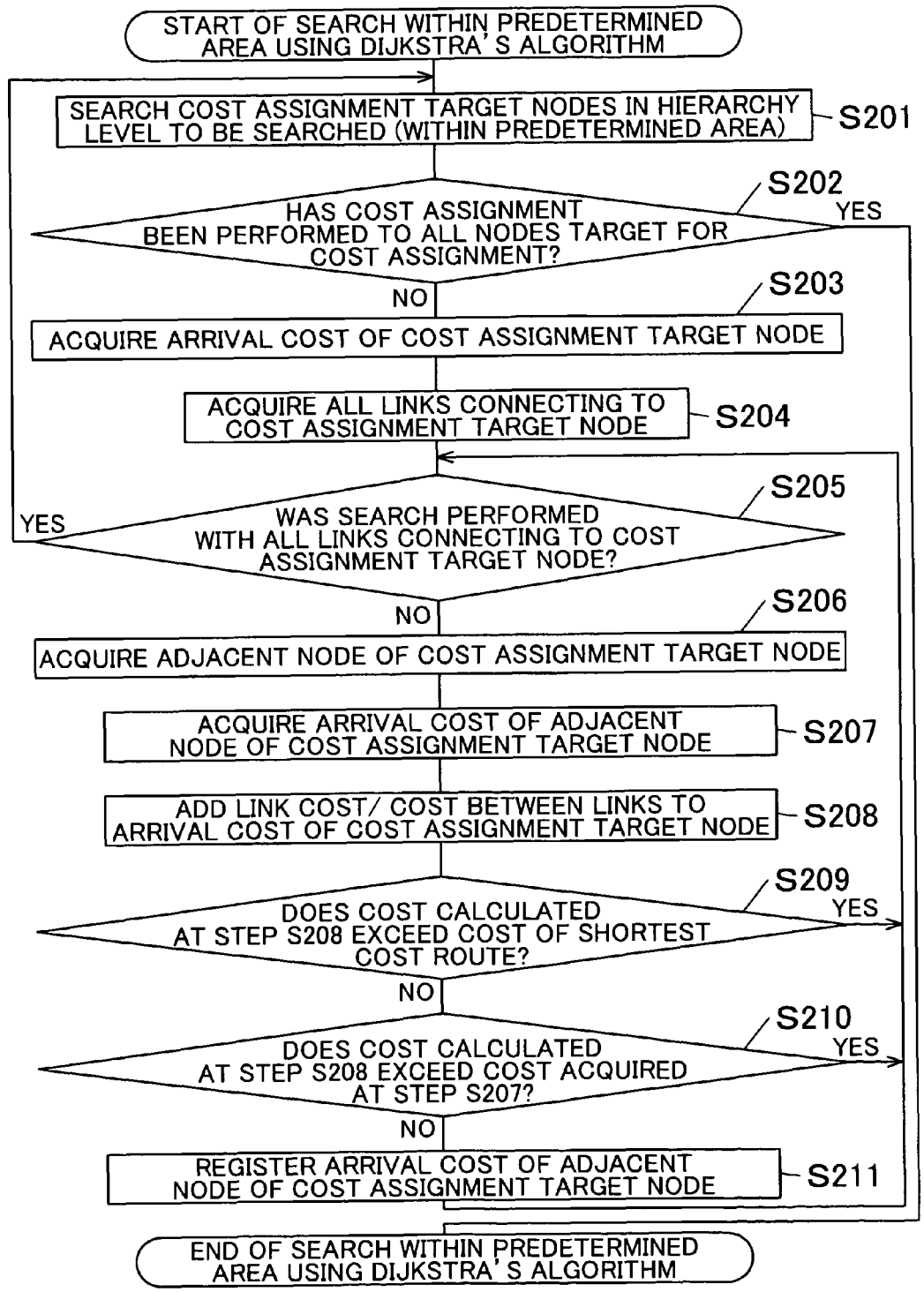
FIG. 7 shows a search processing flow using the Dijkstra's algorithm.

FIG. 7 shows a search processing flow using the Dijkstra's algorithm.

Cost assignment target nodes are searched within each predetermined area on the departure point side and the destination side in the hierarchy level to be searched (Step S201). It is determined whether or not the cost assignment has been performed to all the nodes target for the cost assignment (Step S202). If the cost assignment is not performed to all the target nodes, the arrival cost is acquired for the cost assignment target node (Step S203). For example, in FIG. 8 (black dots indicate the cost assignment target nodes in search target area), the cost assignment target node N3 is a node on the route passing nodes N1 and N2 and 300 is acquired as the arrival cost. Next, all the links connecting to the cost assignment target node are acquired (Step S204), and it is determined whether or not the search was performed with all the acquired links (Step S205). If the search is not performed with all the links, the arrival cost of an adjacent node of the cost assignment target node is acquired (Step S207). In the example of FIG. 8, the adjacent node of the cost assignment target node N3 is N4. When assuming that 500 has been set as the arrival cost to the adjacent node N4 on the route passing other nodes Nm, the value 500 is acquired. Then, a link cost/a cost between links (a node cost) is added to the arrival cost of the cost assignment target node (Step S208). It is determined whether or not the added cost exceeds the cost of the shortest cost route (Step S209). If the added cost does not exceed the cost of the shortest cost route, it is determined whether or not the cost calculated at Step S208 exceeds the arrival cost of the adjacent node acquired at Step S207 (Step S210). In the example of FIG. 8, a cost LC of the link to be added to the cost assignment target node N3 is 150. When adding 150, the arrival cost of the adjacent node N4 becomes 450. On the other hand, it is assumed that the cost of the already-acquired shortest cost route is 700. The cost 450 of the adjacent node N4, which was acquired by adding the link cost LC to the cost assignment target node N3, is smaller than the cost 700 of the shortest cost route and also smaller than the arrival cost 500, which is already set to the adjacent node N4. Therefore, the arrival cost of the adjacent node N4 is updated to 450. The procedure returns to Step S205 and the same processing is performed.

At Step S209, if the cost calculated at Step S208 exceeds the cost of the shortest cost route, or if the cost acquired at Step S208 exceeds the cost of the adjacent cost, the already-set arrival cost of the adjacent node is retained. Then, the procedure returns to Step S205 and the same processing is performed. For example, in the example of FIG. 8, the link cost LC between the cost assignment target node N3 and the adjacent node N5 is 500, and the arrival cost of the adjacent node N5 becomes 800. This exceeds the cost 700 of the already-acquired shortest cost route; therefore, the subsequent cost assignment is not performed and a cost $\infty$ is set to the relevant node. Then, the procedure returns to Step S205. In the case of another adjacent node N6, the link cost LC between the cost assignment node N3 and the adjacent node N6 is 100. When adding 100, the arrival cost becomes 400 and this cost is set. By performing such processing sequentially, the search is performed with all the links connecting to the cost assignment target node at Step S205. When the cost assignment is performed to all target nodes within the area at Step S202, the processing of the search within the area is terminated.

Figure 9A:
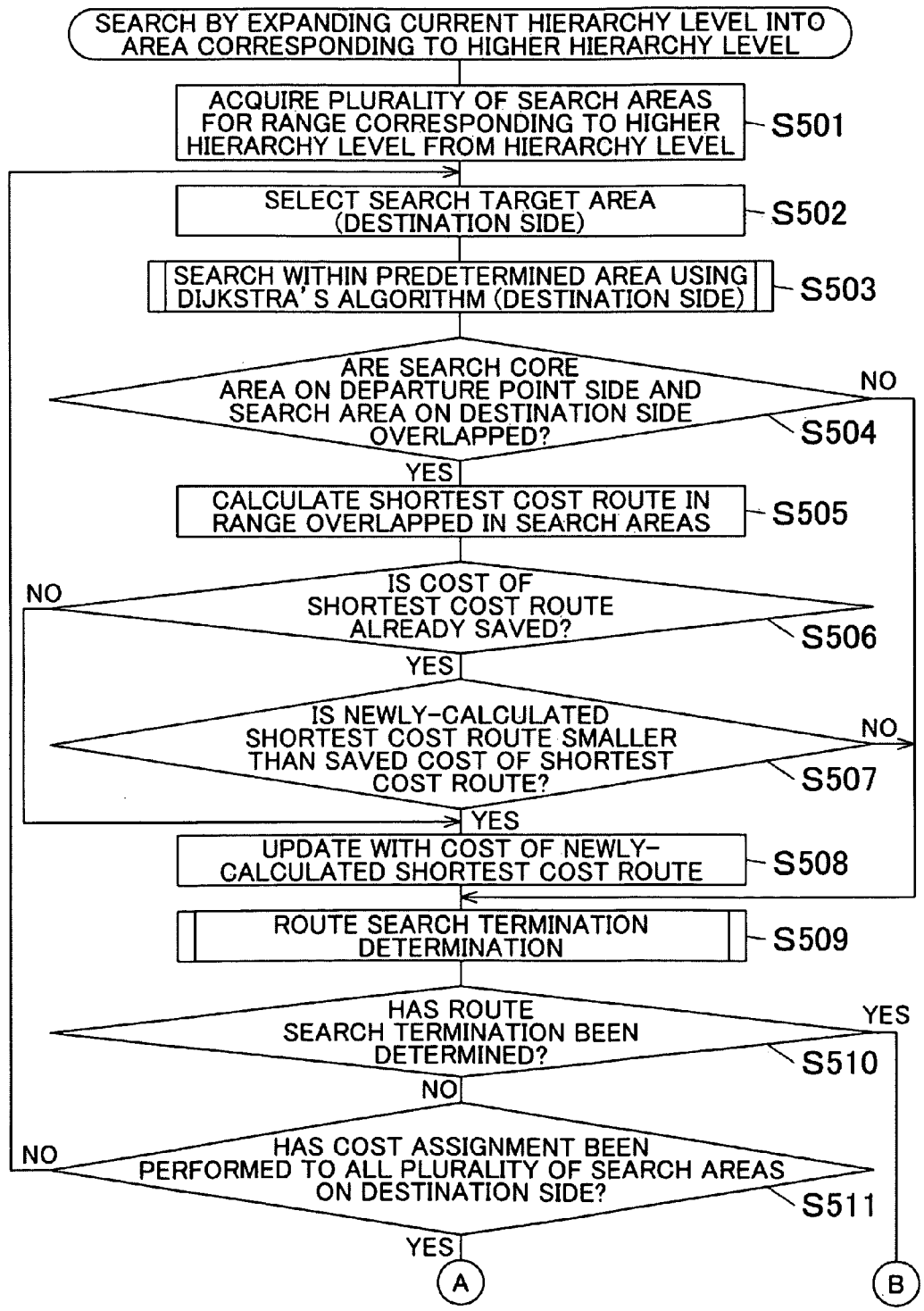

FIGS. 9A and 9B illustrate a flow of performing search processing by expanding the current hierarchy level into the area corresponding to the higher hierarchy level.

A plurality of the search areas for the range corresponding to the higher hierarchy level is acquired for the departure point side and the destination side from the map data of the current hierarchy level (Step S501). As illustrated with the examples of FIGS. 3 and 4, this is to cover the search areas of the excluded higher hierarchy level. In the example of FIGS. 9A and 9B, as the search core area (the area A) is already acquired at Steps S103 and S104 in the processing flow of FIGS. 5A and 5B, the other 3 areas (the areas B, C, and D) are acquired at Step S501. Next, the search target area on the destination side is selected (Step S502). This is processing of selecting a selecting order, in the case of the example of FIG. 4, for the areas B, C, and D. The areas are selected in the order of the adjacent area having the boundary node with a smaller cost in the search core area, as explained before. Next, for the selected area, the search within the predetermined area is performed using the Dijkstra's algorithm (Step S503). It is determined whether or not the search core area on the departure point side and the search area on the destination side are overlapped (Step S504). If overlapped, a route with the shortest cost is calculated in the range overlapped in the search areas (Step S505). Next, it is determined whether or not the cost of the shortest cost route is already saved (Step S506). If saved, it is determined whether or not the cost of the newly-calculated shortest cost route is smaller than the saved cost of the shortest cost route (Step S507). If the cost of the newly-calculated shortest cost route is smaller, or if the cost of the shortest cost route is not saved at Step S506, the cost of the shortest cost route is updated (Step S508). If the search core area on the departure point side and the search area on the destination side are not overlapped at Step S504, or if the cost of the newly-calculated shortest cost route is not smaller than the saved cost of the shortest cost route at Step S507, the route search termination determination is performed (Step S509) (as will hereinafter be described in detail). Even in the lowest hierarchy level, the route search is terminated if the departure point and the destination belong to the same search core area. If the route search termination is not determined (Step S510: NO), it is determined whether or not the cost assignment has been performed to all the plurality of the search areas on the destination side (Step S511). If the cost assignment is not performed to all the plurality of the search areas, the procedure returns to Step S502 and the same processing is repeated.

If the cost assignment has been performed to all the plurality of the search areas at Step S511, the search target area on the departure point side is selected (Step S512). This is processing of selecting a selecting order, in the case of the example of FIG. 4, for the areas B, C, and D as Step S502. Next, for the selected area, the search within the predetermined area is performed using the Dijkstra's algorithm (Step S513). It is determined whether or not the search area on the departure point side and the search area on the destination side are overlapped (Step S514). If overlapped, a route with the shortest cost is calculated in the range overlapped in the search areas (Step S515). Next, it is determined whether or not the cost of the shortest cost route is already saved (Step S516). If saved, it is determined whether or not the cost of the newly-calculated shortest cost route is smaller than the saved cost of the shortest cost route (Step S517). If the cost of the newly-calculated shortest cost route is smaller, or if the cost of the shortest cost route is not saved at Step S516, the cost of the shortest cost route is updated (Step S518). If the search area on the departure point side and the search area on the destination side are not overlapped at Step S514, or if the cost of the newly-calculated shortest cost route is not smaller than the saved cost of the shortest cost route at Step S517, the route search termination determination is performed (Step S519).

If the route search termination is not determined (Step S520: NO), it is determined whether or not the cost assignment has been performed to all the plurality of the search areas on the departure point side (Step S521). If the cost assignment is not performed to all the plurality of the search areas, the procedure returns to Step S512 and the same processing is repeated. If the route search termination has been determined at Step S510 or Step S520, the search by expanding the current hierarchy level into the area corresponding to the higher hierarchy level is terminated. If the cost assignment has been performed all the plurality of the search areas on the departure point side at Step S521, the route search is continued (the procedure proceeds to Step S114 and Step S115).

Figure 10:
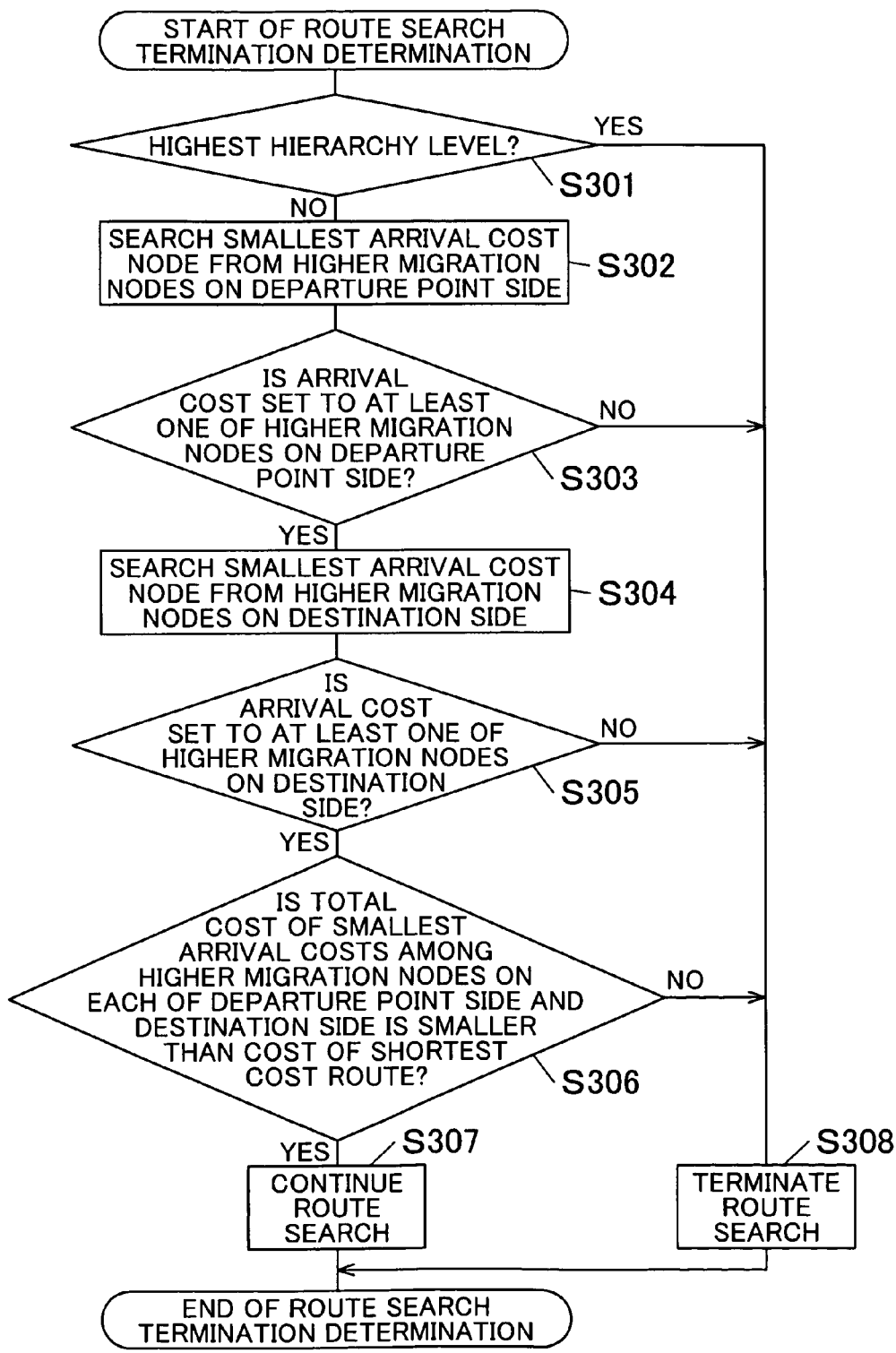
FIG. 10 illustrates a route search termination determination.

FIG. 10 illustrates the route search termination determination.

It is determined whether or not the search target hierarchy level is the highest hierarchy level (Step S301). If not the highest hierarchy level, the smallest arrival cost node is searched from higher migration nodes (area boundary nodes) on the departure point side (Step S302), and it is determined the arrival cost is set to at least one of the higher migration nodes on the departure point side (Step S303). Next, the smallest arrival cost node is searched from higher migration nodes (area boundary nodes) on the destination side (Step S304), and it is determined the arrival cost is set to at least one of the higher migration nodes on the destination side (Step S305). If the higher migration nodes are set both on the departure point side and the destination side, it is determined whether or not the total cost of the smallest arrival costs among the higher migration nodes on each of the departure point side and the destination side is smaller than the cost of the shortest cost route (Step S306). If the total cost of the higher migration node smallest costs is smaller than the cost of the shortest cost route, the route search is continued. If the arrival cost is not set at Step S303 or Step S305, the search on moving to the higher hierarchy level is not performed. If the total cost of the higher migration node smallest arrival costs on each of the departure point side and the destination side is greater than the cost of the shortest cost route, the route search is terminated because further shortest cost routes do not exist even when the search is performed in the higher hierarchy level (Step S308).

Figure 11A:
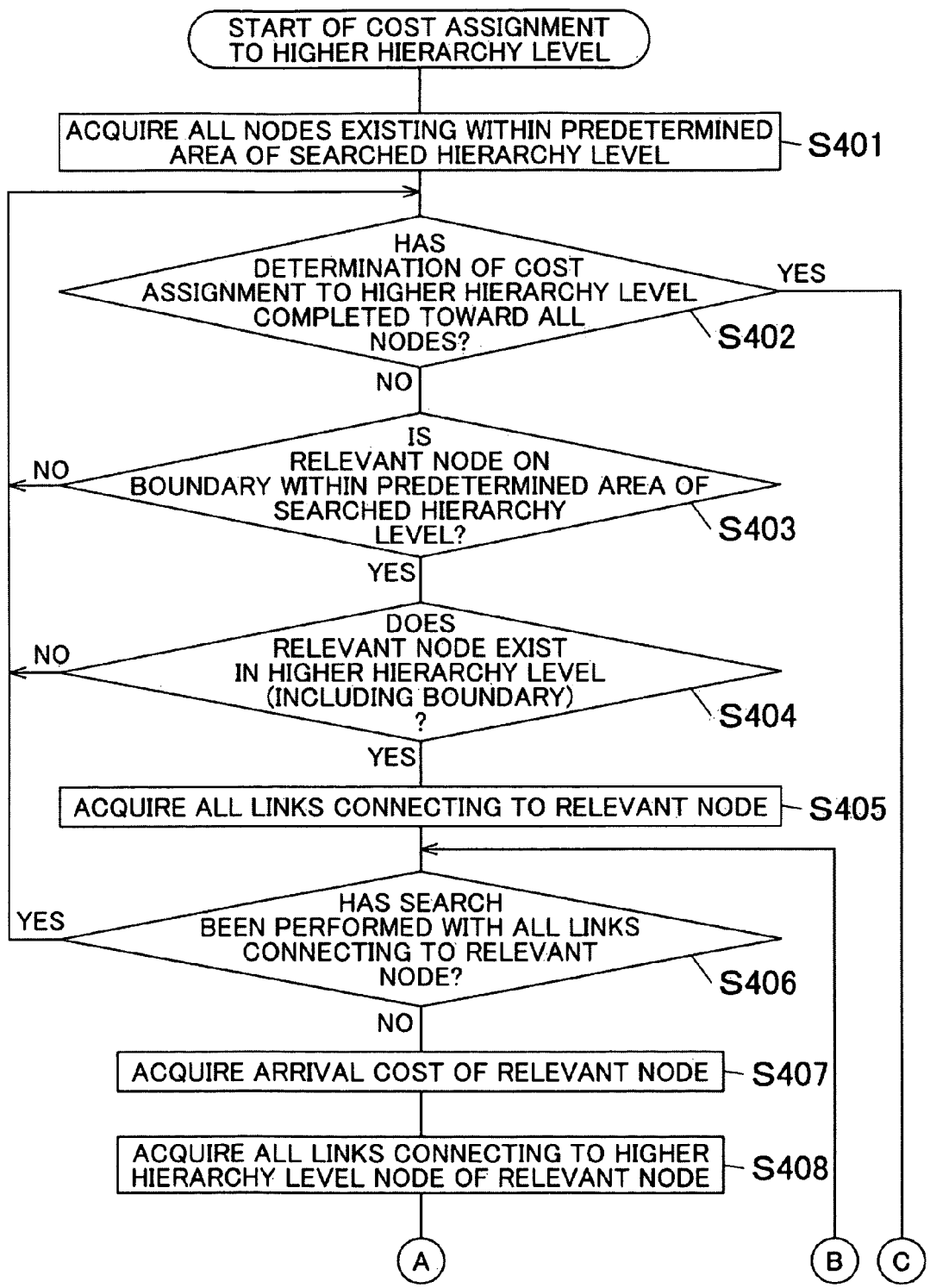
FIGS. 11A and 11B show a flow of cost assignment processing to the higher hierarchy level.
Figure 11B:
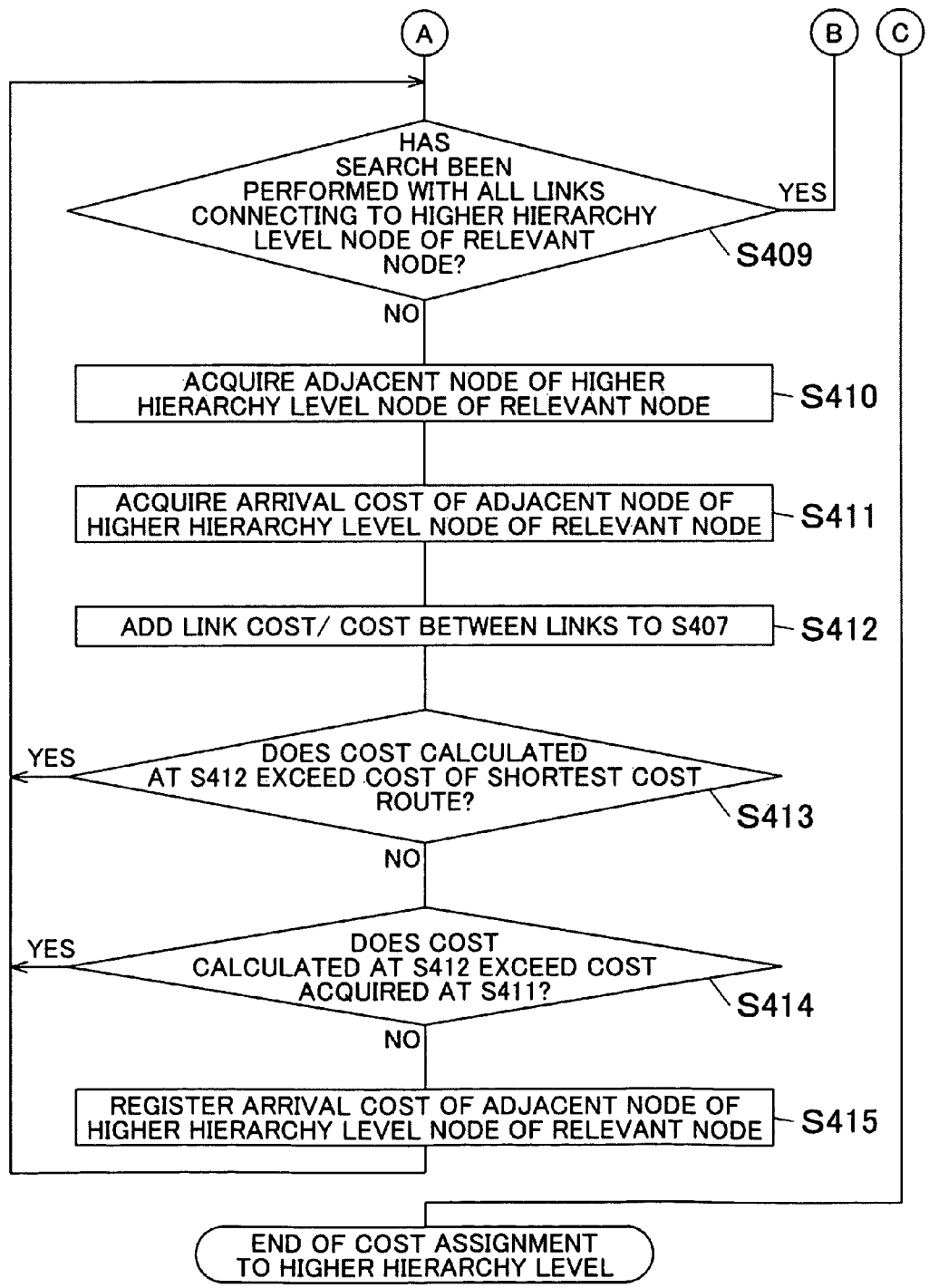
Figure 12:
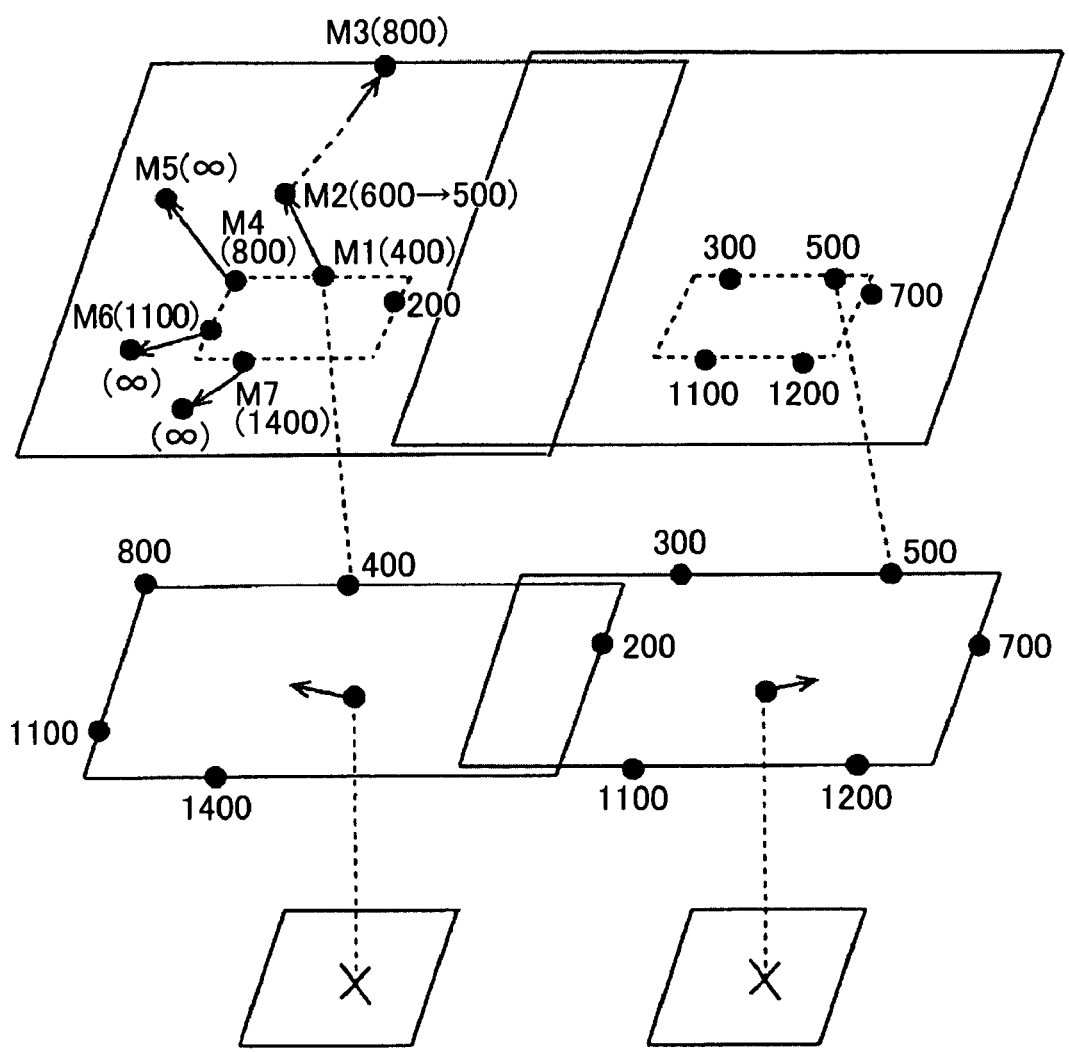
FIG. 12 illustrates the cost assignment to the higher hierarchy level.

Next, FIGS. 11A, 11B and 12 illustrate cost assignment processing to the higher hierarchy level.

FIGS. 11A and 11B show a flow of the cost assignment processing to the higher hierarchy level. FIG. 12 shows an example of the cost assignment to the higher hierarchy level.

In FIGS. 11A and 11B, all the nodes existing within the predetermined area of the searched hierarchy level are acquired (Step S401). For the searched hierarchy level, the cost assignment to all the nodes within the predetermined area is already completed using the Dijkstra's algorithm. It is determined whether or not a determination of the cost assignment to the higher hierarchy level has been completed toward all the nodes (Step S402). If not completed, it is determined whether or not a focused node is a node existing on the boundary within the predetermined area of the searched hierarchy level (Step S403). If the relevant node is not a node existing on the boundary, the procedure returns to Step S402 and the processing is continued. This is processing to make only boundary nodes to be migrated to the higher hierarchy level. If the relevant node is a node existing on the boundary, it is determined whether or not the relevant node exists within the predetermined area (including the boundary) in the higher hierarchy level (Step S404). If the relevant node does not exist within the predetermined area (including the boundary) in the higher hierarchy level, the search cannot be continued. Therefore, the procedure returns to Step S402 and the processing is continued. If the relevant node is the boundary node and the relevant node exists in the higher hierarchy level, all the links connecting to the relevant node are acquired (Step S405), and it is determined whether or not the search has been performed with all the links connecting to the relevant node (Step S406). The search with all the links connecting to the boundary node is search processing for the shortest cost search in the search hierarchy level. At a step of the processing of the cost assignment to the higher hierarchy level, acquisition processing of the shortest cost route in the search hierarchy level is simultaneously performed. For example, in FIG. 12, when it is assumed that in the search processing of the search hierarchy level, the costs of 5 boundary nodes on the departure point side are calculated as 200, 400, 800, 1100, and 1400, and the costs of 5 boundary nodes on the destination side are calculated as 300, 500, 700, 1100, and 1200, these nodes are migrated to the higher hierarchy level and the cost assignment to the higher hierarchy level is performed. At the same time, the shortest cost route is searched through the route search between the 5 boundary nodes in the search hierarchy level.

If the search with all the links is not performed at Step S406, the arrival cost of the relevant node is acquired (Step S407), and all the links connecting to the higher hierarchy level node of the relevant node are acquired (Step S408). Next, it is determined whether the search has been performed with all the links connecting to the higher hierarchy level node of the relevant node (Step S409). If the search is not performed with all the links, the adjacent node of the higher hierarchy level node of the relevant node is acquired (Step S410) and the arrival cost is acquired (Step S411). Next, the link cost/ the cost between links (the node cost) between the relevant node and the adjacent node is added to the arrival cost of the relevant node acquired at Step S407, and it is determined whether or not the added cost exceeds the cost of the shortest cost route being currently acquired (Step S413). If not exceed, it is determined whether or not the added cost exceeds the arrival cost of the adjacent node of the higher hierarchy level node of the relevant node (Step S414). If the added cost does not exceed any of them, the arrival cost of the adjacent node of the higher hierarchy level node of the relevant node is registered and updated. The procedure returns to Step S409 and the same processing is continued. For example, in the area on the departure point side of FIG. 12, when focusing on a node M1 with a cost 400, if the link cost LC between the node M1 and the adjacent node M2 is 100, the link cost 100 is added to the cost 400 of the node M1 to acquire the arrival cost 500 for the adjacent node M2. If the cost of the shortest cost route being acquired at this moment is 1000, the arrival cost of the adjacent node M2 is smaller than the cost of the shortest route. In addition, if it is assumed that the arrival cost 600 has been set to the adjacent node M2 by the search from another route, the arrival cost of the adjacent node M2 acquired by the search from the node M1 is smaller than the arrival cost 600. Therefore, the arrival cost of the adjacent node M2 is registered and updated from 600 to 500. By sequentially performing the cost assignment in this manner, a cost 800 of a boundary node M3 in the area of the higher hierarchy level is acquired.

If the cost calculated at Step S412 (the cost acquired by adding the link cost/the cost between links (the node cost) to the arrival cost of the relevant node) exceeds the cost of the shortest cost route at Step S413, further cost assignment is not performed. The procedure returns to Step S409 and the same processing is continued. For example, in the area on the departure point side of FIG. 12, when focusing on a node M4 with an arrival cost 800, if the cost of the link LC between the node M4 and the adjacent node M5 is 250, the arrival cost of the adjacent node M5 becomes 1050, which exceeds the cost of the shortest cost route 1000. Therefore, further cost assignment is not performed, and the cost ∞ is set to the node M5. In addition, costs 1100 and 1400 are set to a node M6 and a node M7 respectively because the cost 1000 of the shortest cost route was unknown yet when moving to the higher hierarchy level. However, all the arrival costs of the nodes connecting to these nodes exceed the cost of the shortest cost route. Therefore, further cost assignment is not performed, and the cost ∞ is set to these nodes. Further, also if the cost calculated at Step S412 exceeds the arrival cost of the adjacent node at Step S414, the cost is not registered. The procedure returns to Step S409 and the same processing is continued. When the search with all the links connecting to the higher hierarchy level nodes at Step S409 is completed and the determination of the cost assignment to the higher hierarchy level toward all the nodes in the search hierarchy level is determined as terminated at Step S402, the cost assignment to the higher hierarchy level is terminated.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A navigation device that searches for a route from a departure point to a destination, comprising:
   an information storage unit that stores map data in a hierarchical structure, the hierarchical structure being defined such that:
      a lowest level of the hierarchical structure includes the map data for all roads, including local roads,
      a highest level of the hierarchical structure includes the map data for only major roads, and
      one or more middle levels of the hierarchical structure includes the map data for the major roads and the map data for one or more categories intermediate roads, but not the map data for the local roads,
   map data being excluded from at least one of the defined middle levels of the hierarchical structure in order to reduce the overall size of the map data stored in the information storage unit; and
   a controller that:
      reads the map data from the information storage unit;
      performs a route search within a predetermined area of each level of the hierarchical structure that includes map data and acquires a shortest cost route; the predetermined area within each hierarchical level having map data that exists immediately below a hierarchical level having no map data being expanded into an expanded search area having a size equal to a predetermined area that would have been searched in the hierarchical level having no map data if it had had map data;
      performs a route search in the expanded search area to acquire a first route;
      performs a route search in a hierarchy level higher than the hierarchy level including the first route to acquire a second route;
      determines whether the first route or the second route has a smaller cost; and
      identifies the one of the first route and the second route having the smallest cost as a shortest cost route.

2. The navigation device according to claim 1, wherein the controller:
    expands the expanded search area by priority in a direction in which a cost to an area boundary becomes the smallest.

3. The navigation device according to claim 1, wherein the controller:
    ends route searching when a search cost of an incomplete route exceeds the cost of the shortest cost route.

4. The navigation device according to claim 1, wherein the controller:
    ends route searching when an arrival cost is not set to a boundary node on a departure point side or a destination side.

5. The navigation device according to claim 1, wherein the controller
    ends route searching when a total cost of smallest costs of boundary nodes on a departure point side and a destination side is greater than the cost of the shortest-cost route.

6. The navigation device according to claim 1, wherein the controller:
    when an arrival cost of an adjacent node of a higher hierarchy level node corresponding to a boundary node in a lower hierarchy level has exceeded the cost of the shortest-cost route, controls the route search unit not to perform cost assignment to subsequent nodes.

7. A navigation device comprising:
    an information storage unit that stores map data relating to roads in a hierarchical structure, the hierarchical structure being defined such that:
        a lowest level of the hierarchical structure includes the map data for all roads, including local roads,
        a highest level of the hierarchical structure includes the map data for only major roads, and
        one or more middle levels of the hierarchical structure includes the map data for the major roads and the map data for one or more categories intermediate roads, but not the map data for the local roads,
    map data being excluded from at least one of the defined middle levels of the hierarchical structure in order to reduce the overall size of the map data stored in the information storage unit; and
    a controller that:
        searches for a route to a destination based on the map data stored in the information storage unit
        with detailed data in a range of each predetermined area on a departure point side and a destination side the predetermined area within each hierarchical level having map data that exists immediately below a hierarchical level having no map data being expanded into an expanded search area having a size equal to a predetermined area that would have been searched in the hierarchical level having no map data if it had had map data; and
        when a route becomes connected between a departure point and a destination, compares a cost of the route searched in a higher hierarchy level with a cost of the route searched in a lower hierarchy level and terminates route search processing if it is determined that the cost of the route searched in the lower hierarchy level is lower than the cost of the route searched in the higher hierarchy level.

8. A non-transitory computer-readable storage medium storing a computer-executable route search program, the program comprising:
    instructions for accessing an information storage unit that stores map data in a hierarchical structure, the hierarchical structure being defined such that:
        a lowest level of the hierarchical structure includes the map data for all roads, including local roads,
        a highest level of the hierarchical structure includes the map data for only major roads, and
        one or more middle levels of the hierarchical structure includes the map data for the major roads and the map data for one or more categories intermediate roads, but not the map data for the local roads,
    map data being excluded from at least one of the defined middle levels of the hierarchical structure in order to reduce the overall size of the map data stored in the information storage unit;
    instructions for reading the map data from the information storage unit;
    instructions for performing a route search within a predetermined area of each level of the hierarchical structure that includes map data and acquires a shortest cost route; the predetermined area within each hierarchical level having map data that exists immediately below a hierarchical level having no map data being expanded into an expanded search area having a size equal to a predetermined area that would have been searched in the hierarchical level having no map data if it had had map data;
    instructions for performing a route search in the expanded search area to acquire a first route;
    instructions for performing a route search in a hierarchy level higher than the hierarchy level including the first route to acquire a second route;
    instructions for determining whether the first route or the second route has a smaller cost; and
    instructions for identifying the one of the first route and the second route having the smallest cost as a shortest cost route.

* * * * *